United States Patent
Tanaka et al.

[11] Patent Number: 5,815,818
[45] Date of Patent: Sep. 29, 1998

[54] CELLULAR MOBILE COMMUNICATION SYSTEM WHEREIN SERVICE AREA IS REDUCED IN RESPONSE TO CONTROL SIGNAL CONTAMINATION

[75] Inventors: Shoji Tanaka; Toshiya Tsuji, both of Tokyo, Japan

[73] Assignee: NEC Corporation, Tokyo, Japan

[21] Appl. No.: 870,982

[22] Filed: Apr. 20, 1992

[30] Foreign Application Priority Data

Apr. 19, 1991 [JP] Japan ................................. 3-087080

[51] Int. Cl.⁶ .......................... H04B 7/00; H04B 17/00; H04B 1/16
[52] U.S. Cl. ..................... 455/522; 455/38.3; 455/67.3; 455/343
[58] Field of Search ........................... 455/127, 343, 455/63, 69, 67.3, 38.3, 422, 517, 522, 574

[56] References Cited

U.S. PATENT DOCUMENTS

| | | |
|---|---|---|
| 4,435,840 | 3/1984 | Kojima et al. ...................... 455/56.1 |
| 4,613,990 | 9/1986 | Halpern ............................... 455/33.2 |
| 4,696,027 | 9/1987 | Bonta .................................. 455/33.3 |
| 5,003,619 | 3/1991 | Morris et al. ......................... 455/69 |
| 5,056,109 | 10/1991 | Gilhousen et al. ................... 455/69 |
| 5,129,098 | 7/1992 | McGirr et al. ........................ 455/69 |
| 5,204,970 | 4/1993 | Stengel et al. ........................ 455/63 |
| 5,220,678 | 6/1993 | Feei ..................................... 455/69 |
| 5,263,177 | 11/1993 | Schieve et al. ..................... 455/56.1 |
| 5,265,263 | 11/1993 | Ramsdale et al. ................. 455/56.1 |

*Primary Examiner*—Steven J. Saras
*Assistant Examiner*—Vijay Shankar
*Attorney, Agent, or Firm*—Foley & Lardner

[57] ABSTRACT

In order to facilitate communications in a cellular communication system wherein control signal contamination renders communication with the closest cell impossible, the transmission power of the closest cell is reduced to the point wherein communication between the mobile unit and a cell adjacent the closest one, is enabled.

4 Claims, 4 Drawing Sheets

CELLULAR MOBILE COMMUNICATION SYSTEM WHEREIN SERVICE AREA IS REDUCED IN RESPONSE TO CONTROL SIGNAL CONTAMINATION

BACKGROUND OF THE INVENTION

1. Field of the Invention

The present invention relates generally to improvements in a cellular mobile communications system, and more specifically to a method and apparatus of reducing or shrinking a cellularized service area in response to a base station detecting signal contamination which inhibits communication.

2. Description of the Prior Art

It is well known in the art to apply frequency reuse in a mobile communications system in order to satisfy various objectives such as large subscriber capacity, efficient spectrum use, widespread availability, adaptability to traffic density, etc.

Frequency reuse refers to the use of the same radio carrier frequency in a number of different channels to cover different areas which are separated from one another by distances sufficient that objectionable cochannel interference does not occur. A system utilizing such concept is known as a cellular land communications system.

Ordinarily, each base station has one control channel via which each of the mobile units therein requests service to the base station. In the event that a given mobile unit requests a call, it scans all of the control channels to determine the signal strength thereof and selects the strongest control channel. However, if the mobile unit is located near a cell boundary and is prevented from sending a call request to and/or receiving a control channel signal from the base station due to noise environments, the mobile unit has to wait until such signal contamination is cleared or until the unit moves into the adjacent service area (cell).

In order to avoid these problems, if an overlapping area of two adjacent cells is increased, the efficiency of the frequency reuse is undesirably reduced. Further, increasing the number of control channels may be impossible from a practical point of view.

SUMMARY OF THE INVENTION

It is an object of the present invention to provide a method and apparatus wherein a base station reduces service area depending on signal contamination being detected and induces the situation wherein a mobile unit located near the cell boundary is permitted to access a base station located in an adjacent cell.

In brief, the above object is achieved by a technique wherein, when control signal contamination renders communication with the closest cell impossible, the transmission power of the closest cell is reduced to the point wherein communication between the mobile unit and a cell adjacent the closest one, is enabled.

More specifically a first aspect of the present invention comes in a method of controlling service area size in response to control signal contamination being detected in cellular mobile communications system which features the steps of: sensing signal contamination which inhibits communication between a mobile unit and a transceiver of one of a plurality of cells which forms part of said cellular mobile communication system; and reducing the transmission power of the transceiver to a level whereat communication between an adjacent cell and the mobile unit is enabled.

A second aspect of the present invention comes in a cellular mobile communications system which features: means for sensing signal contamination which inhibits communication between a mobile unit and a transceiver of one of a plurality of cells which forms part of said cellular mobile communication system; and means for reducing the transmission power of the transceiver to a level whereat communication between an adjacent cell and the mobile unit is enabled.

A further aspect of the invention comes in a mobile communication system having a plurality of cells, wherein one of said cells includes a transceiver and which features: means for sensing received control channel signal strength; means for detecting received control signal contamination; and means responsive to the detection of received control signal contamination for reducing transceiver transmission power.

Another aspect of the invention comes in a method of controlling a mobile communication system having a plurality of cells, the method featuring the steps of: sensing the strength of a control signal which is received by a transceiver included in one of the cells; detecting received control signal contamination; and reducing transceiver transmission power in response to the detection of received control signal contamination.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

Figure 1:
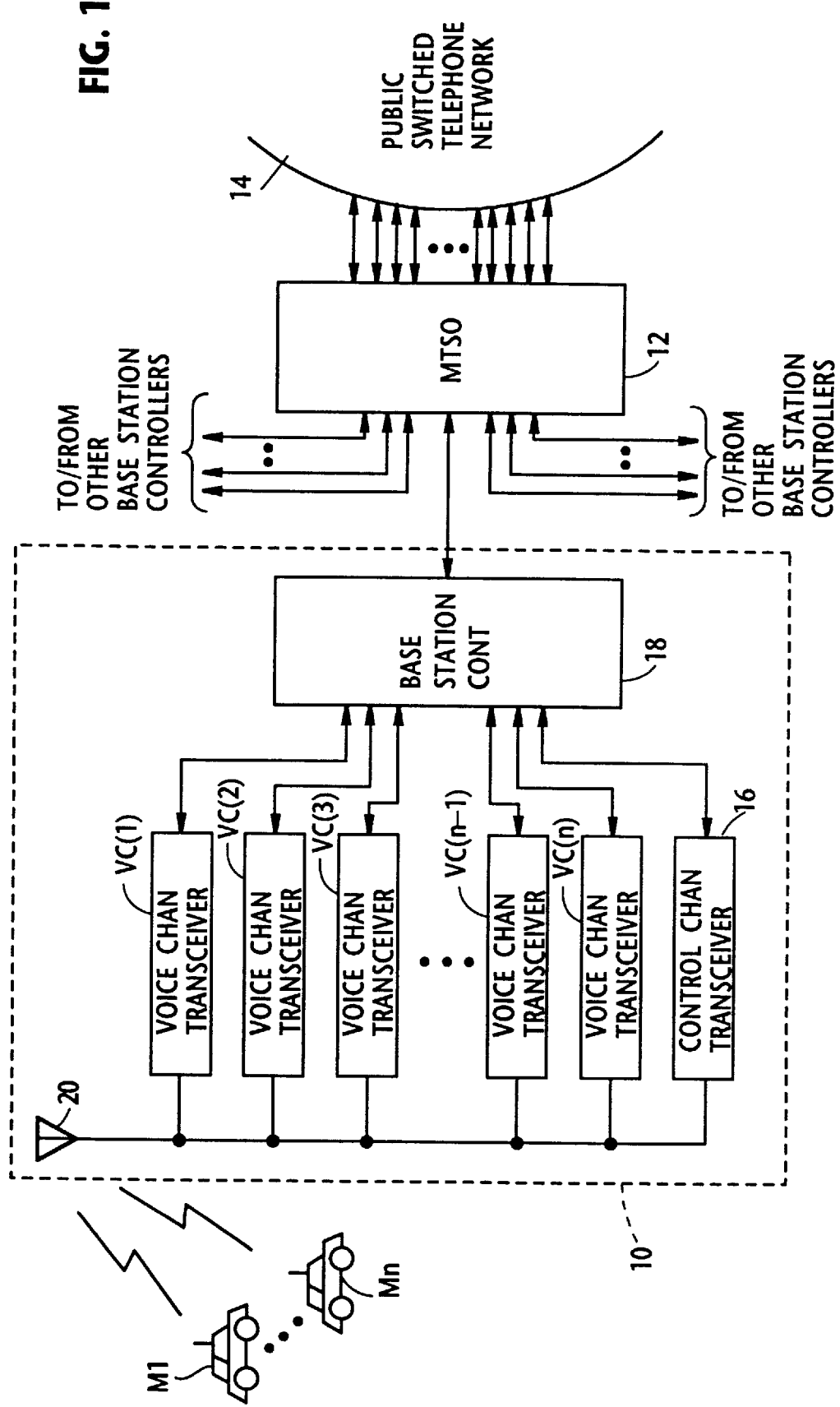
FIG. 1 is a block diagram which schematically illustrates a given base station arrangement and associated system, to which the present invention is applicable.

Reference is now made to FIG. 1, wherein there is shown an overall arrangement of a base station 10 which is located in a given cell and to which the present invention is applicable. The FIG. 1 arrangement further includes a mobile telephone switching office (MTSO) 12 and a public switched telephone network denoted by numeral 14, both of which are well known in the art and detailed descriptions of which are deemed unnecessary.

The base station 10 is provided with a plurality of voice channel transceivers VC(1)–VC(n), a single control channel transceiver 16, and a base station controller 18. Each of the transceivers VC(1)–VC(n) and 16, is coupled to a cellular antenna 20 via which the base station 10 communicates with one or more mobile units denoted by M1 . . . Mn.

The MTSO 12 is coupled to a plurality of other base station controllers (not shown) which are respectively located in other cells (also not shown).

An important feature with cellular service is the ability to make telephone calls to the mobile unit over the public switched telephone network 14 as if the mobile unit were in fact a normal telephone.

One embodiment of the present invention will be discussed in detail with reference to FIGS. 2–4.

Figure 2:
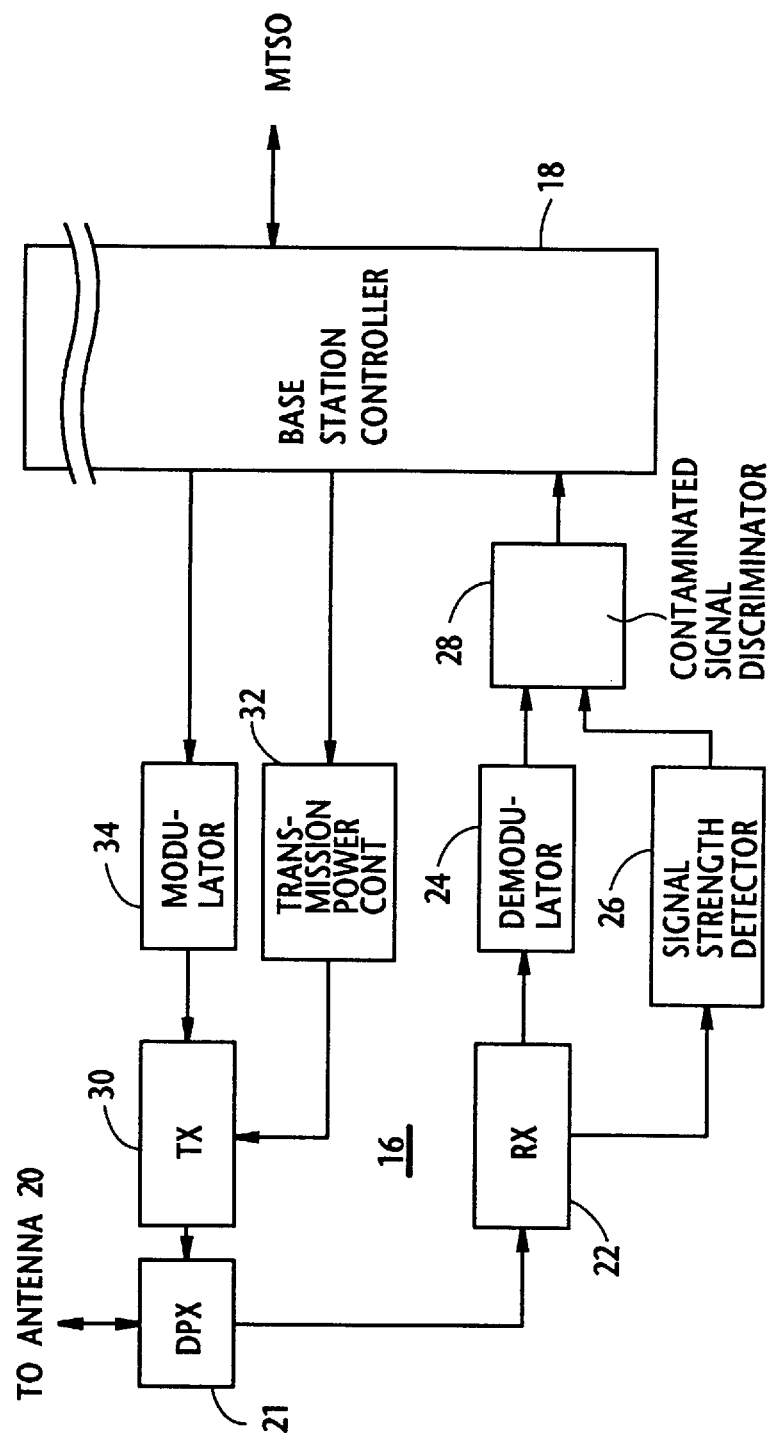
FIG. 2 is a block diagram of a transceiver dedicated to a control channel together with a portion of a base station controller, both shown in FIG. 1.

FIG. 2 is a block diagram which schematically shows the arrangement of the control channel transceiver 16 and a portion of the base station controller 18 of FIG. 1.

Figure 3:
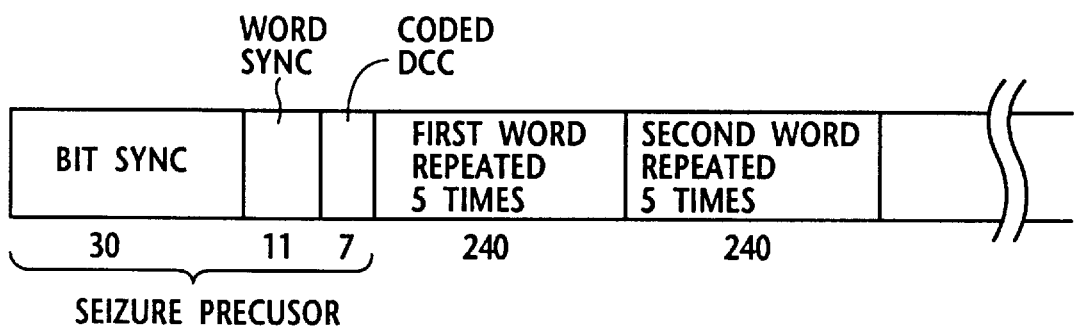
FIG. 3 is a data format on a reverse control (viz., setup) channel through which a mobile unit acts in a random and competitive manner to initiate calls.

FIG. 3 shows a code format of a call request signal transmitted from a given mobile unit to the control channel transceiver 16. In FIG. 3, each of the numerals below the format depicts the number of bits. The code format includes a seizure precursor consisting of a 30-bit sync (101010 . . . 10), an 11-bit word sync (11100010010), and a coded DCC (Digital Color Code) for specifying the base station at which the message is aimed. The format shown in FIG. 3 is a standard format well known in the art. Further description of the same is deemed unnecessary.

It is assumed that a call request signal transmitted from one of the mobile units M1–Mn is routed to a receiver (RX) 22 by way of the antenna 20 and a duplexer (DPX) 21. It is further assumed that the call request signal is contaminated or deteriorated by noise, free-space propagation losses, fading, etc. The call request signal is converted into the corresponding IF (intermediate frequency) and then demodulated at a demodulator 24. On the other hand, the IF signal is applied to a signal strength detector 26 at which the incoming signal level is detected.

A contaminated signal discriminator 28 is supplied with the demodulated signal (viz., baseband signal) from the demodulator 24 and also with the signal level from the detector 26. The discriminator 28 checks to see if the seizure precursor (FIG. 3) has been disturbed or if sync is not established thereby. In the event that the discriminator 28 detects the infection of the incoming call request signal, the discriminator 28 permits the output of the signal strength detector 26 to be applied to the base station controller 18. Otherwise, the demodulated signal is fed to the controller 18 and subsequently a normal operation is implemented.

The base station controller 18 responds to the signal level applied thereto and controls the transmission power of the transceiver 16 in question. More specifically, the base station controller 18 reduces or controls the transmission power of a transmitter 30 by applying a suitable control signal to a transmission power controller 32 at a time interval of one or two seconds (merely by way of example). Thus, the service area covered by the base station 18 is reduced or controlled within a predetermined range. A modulator 34 which is arranged between the base station controller 18 and the transmitter 30, is configured and operates in exactly the same manner as conventionally known ones, and thus further description is omitted for the sake of simplicity.

The operations of the present invention will further be discussed with reference to FIG. 4.

Figure 4:
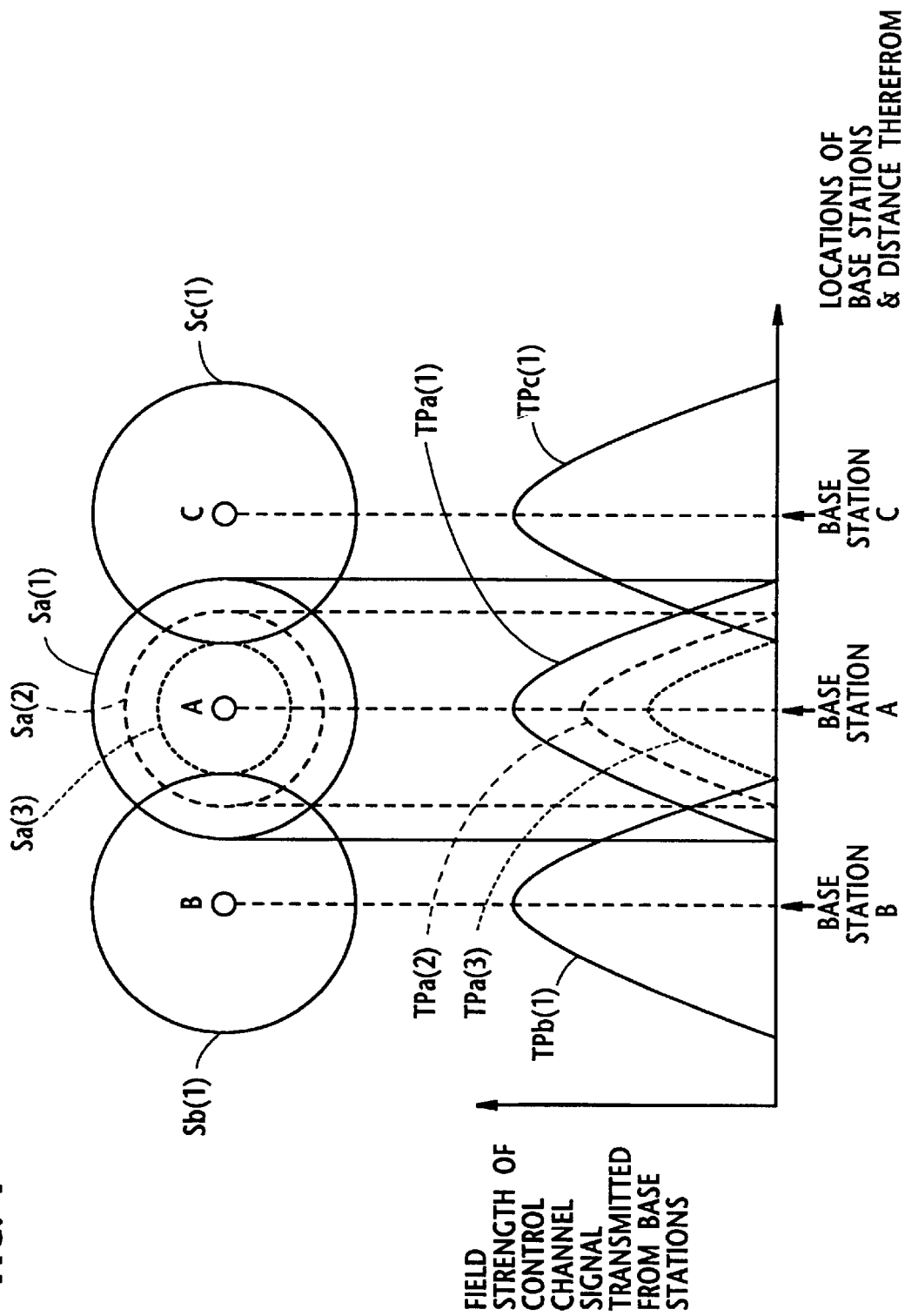
FIG. 4 is a sketch for describing the operations of the present invention.

FIG. 4 is a diagram showing, at an upper portion thereof three service areas Sa(1), Sb(1) and Sc(1) which are respectively covered by three base stations A, B and C. The base station A corresponds to the station 10 shown in FIG. 1. Each of the service areas Sa(1)–Sc(1), has been initially determined and is not subject to any reduction or shrinkage as long as no signal infection is found by the signal discriminator 28 (FIG. 2). Although the service areas are depicted as circles, their actual shape is irregular and depends on the terrain and radio propagation. However, it is understood that the present invention is also applicable to an irregular shaped service area.

In connection with the base station A, two additional service area limits Sa(2) and Sa(3) are illustrated. The service area limit Sa(3) depicts the minimum to which the service area Sa(1) can be reduced by lowering the transmission power, while the service area limit Sa(2) is controlled to be between Sa(1) and Sa(3) depending on the transmission power control (viz., the contaminated signal level).

FIG. 4 also shows, at the lower portion thereof, the field strength of a control channel signal sent from the base station, versus the locations of the stations A–B and distances therefrom, in terms of various transmission powers, of the stations A–C. Transmission powers TPa(1), TPb(1), TPc(1), TPa(2) and TPa(3) correspond respectively to the service areas bounded by the limits Sa(1), Sb(1), Sc(1), Sa(2) and Sa(3).

From the foregoing, it is understood that in order to facilitate communications in a cellular communication system wherein control signal contamination renders communication with the closest cell impossible, the transmission power of the closest cell is reduced to the point wherein communication between the mobile unit and a cell adjacent the closest one, is enabled.

It will be understood that the above disclosure is representative of only one possible embodiment of the present invention and that the concept on which the invention is based is not specifically limited thereto.

What is claimed is:

1. A method of controlling service area size of a given cell in response to control channel signal contamination being detected at a base station of said given cell in a cellular mobile communications system, comprising the steps of:

sensing the control channel signal contamination which inhibits communication between a mobile unit and a transceiver of the base station;

detecting the contaminated control channel signal level; and reducing the transmission power of the transceiver of the base station, in response to the contaminated control channel signal level, to a level whereat communication between a base station of a cell adjacent to said given cell and the mobile unit is enabled.

2. A cellular mobile communications system, comprising:

means for sensing control channel signal contamination which inhibits communication between a mobile unit and a transceiver of a base station of a given cell which forms part of said cellular mobile communications system;

means for detecting the contaminated control channel signal level; and means for reducing the transmission power of the transceiver of the base station, in response to the contaminated control signal level, to a level whereat communication between a base station of a cell adjacent to said given cell and the mobile unit is enabled.

3. A method as set forth in claim 1, wherein the step of reducing the transmission power of the transceiver of the base station is executed discretely in response to the contaminated control channel signal level.

4. A cellular mobile communications system having a plurality of cells, each cell containing a base station comprising a base station controller, a control channel transceiver, and a plurality of voice channel transceivers, the control channel transceiver of the base station of at least one of the plurality of cells comprising:

a duplexing unit, receiving a call request signal from an antenna and sending said call request signal to a receiving unit which converts said call request signal to an intermediate frequency;

a demodulating unit, receiving said converted call request signal, and producing a demodulated signal;

a signal strength detecting unit, receiving said converted call request signal, and producing a signal strength indication signal corresponding to the signal strength of said converted call request signal; and a contaminated signal discriminating unit, passing said demodulated signal to said base station controller if said demodulated signal contains a predetermined seizure precursor, and passing said signal strength indication signal to said base station controller if said demodulated signal does not contain said predetermined seizure precursor, wherein said base station controller reduces a transmission power of said control channel transceiver in response to said signal strength indication signal.

* * * * *